W. H. PUMPHREY.
HOSE SUPPORTER CLASP.
APPLICATION FILED MAR. 12, 1907.
965,935.
Patented Aug. 2, 1910.
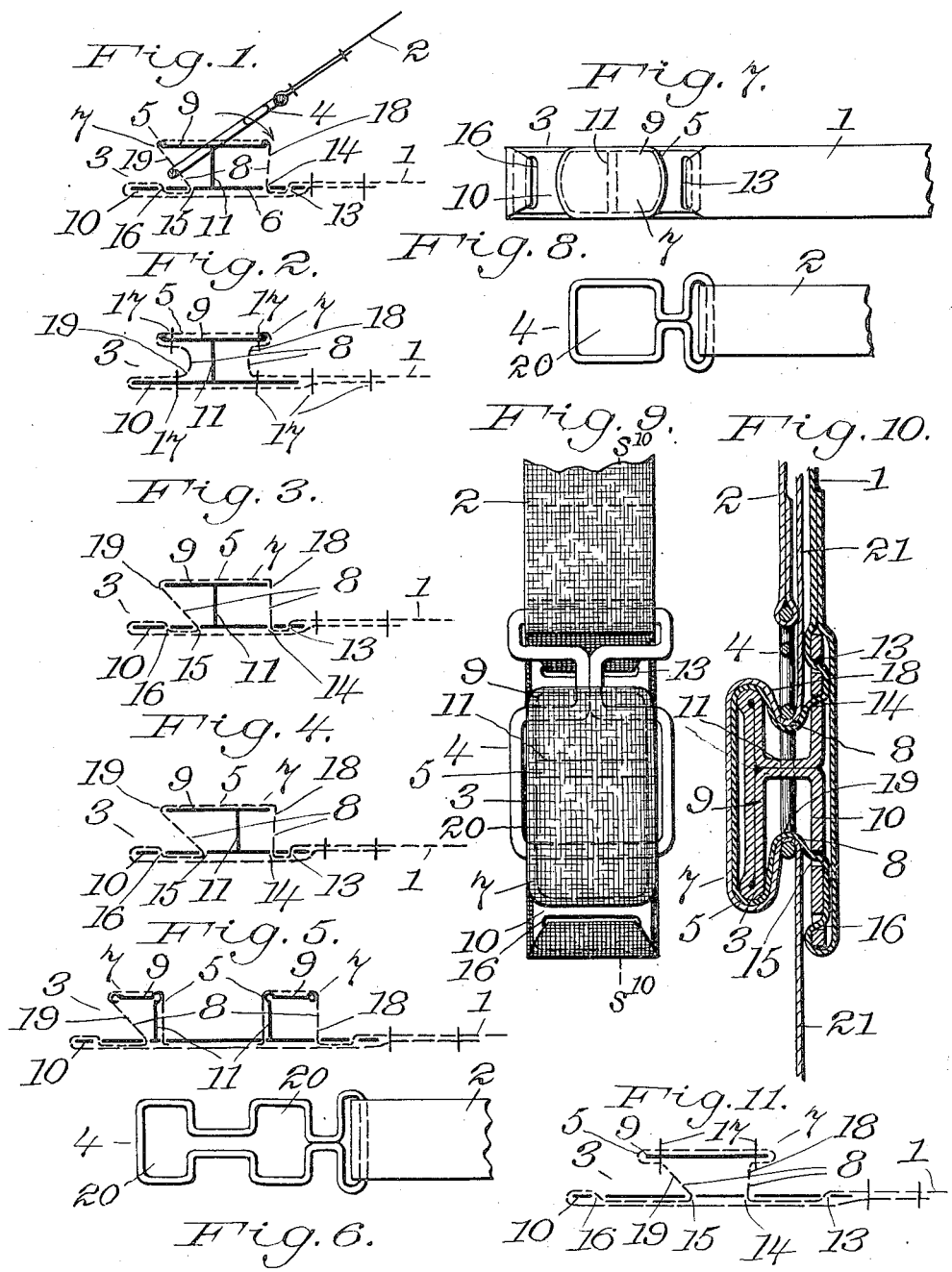

UNITED STATES PATENT OFFICE.

WALTER H. PUMPHREY, OF NEW YORK, N. Y.

HOSE-SUPPORTER CLASP.

965,935.

Specification of Letters Patent. Patented Aug. 2, 1910.

Application filed March 12, 1907. Serial No. 362,054.

*To all whom it may concern:*

Be it known that I, WALTER H. PUMPHREY, a citizen of the United States, residing at New York city, borough of Manhattan, in the county and State of New York, have invented certain new and useful Improvements in Hose-Supporter Clasps, of which the following is a specification.

My invention relates to garment supporters and has particular reference under this general class, to garter clasps or fastenings.

Several forms of a device, suitable for carrying my invention into effect, are illustrated in the accompanying drawings.

From the modifications shown and from the claims, it will be understood that I do not consider my invention limited to the particular constructions shown, although such are in my opinion the best now known to me.

In the drawings, Figure 1 is a view in diagram, showing the position of the members of the clasp previous to complete engagement or disengagement. Fig. 2 is a view in diagram showing a slightly modified form of the headed member. Figs. 3, 4, 5 and 11 are like views illustrating further modifications of the same. Fig. 6 shows a modified form of the bail. Figs. 7 and 8 are plan views of the members shown in Fig. 1. Fig. 9 is a similar view of the member illustrated in Fig. 4, showing the bail in engagement therewith, and Fig. 10 is a sectional view, taken on the line $s^{10}$, $s^{10}$, of Fig. 9, showing a portion of a garment secured by the same.

Referring now to the drawings, 1 and 2 represent pieces of elastic or non-elastic webbing or other suitable material, to which the members 3 and 4 of the clasp are secured in suspended relation, as in many forms of garters now in general use. In the type of garter illustrated, the headed member 3, is worn inside the stocking and the apertured member 4, outside, so that when engaged, the stocking is caught and held between them.

The member 3 consists essentially of a loop 5, which is preferably formed as a continuation of the supporting webbing and by means of a frame or former 6, the loop is given suitable shape to provide a head 7 and shank 8. The frame or former 6 may be stamped or struck up from sheet metal or other material and as shown consists of a base plate 10 having rigid projections 11 thereon, which terminate in bent over portions 9 extending substantially parallel to the base plate. The projections 11 may be centered relative to the portions 9 and 10 of the frame or former as in Figs. 1, 2, 3 and 7 or off-set somewhat, as in Figs. 4, 9 and 10, the result being practically the same and not in any wise affecting the principle of operation or the relation of parts, etc.

The part 10 of the frame is shown in some of the figures as having openings 13, 14, 15 and 16 formed therein through which the webbing is threaded but if desired, such openings may be omitted and the webbing secured by lines of stitching, indicated at 17 in Fig. 2. The method of securing the webbing by threading it through the openings is preferred, as a considerable saving in time and labor results over sewing.

The openings 14 and 15 are so relatively spaced, that when the webbing is threaded through the same, the side 18 of the shank thus formed, extends substantially at right angles to the parallel portions 9 and 10 of the frame and the other side 19 thereof, at about 45 degrees. As shown, the end of the webbing is first passed downwardly through the opening 13, then upwardly through the opening 14, over the part 9 of the frame, then downwardly through opening 15 to complete the loop 5 and finally, upward through opening 16, over the end of the frame and back along the underside thereof to the main portion of the webbing, to which it is secured by several lines of stitching or other suitable means.

The head 7, formed as above described, is non-yielding, that is to say, no change occurs in either its length or breadth as the bail or apertured member is caused to engage therewith. The shank 8, however, lies clear of the frame and is not only free to yield but is shiftable relative to the head under the action of the bail or the pull of the stocking or both.

As shown in Figs. 4 and 10, before the bail is placed in position, the shank is in effect, off-set somewhat from the center of the head and as the bail is placed over the head, the shank is first compressed owing to the fact that the opening in the bail is slightly smaller than the thickness of the shank and in yielding to the downward pull of the stocking, the shank is drawn into approximately centered relation to the head, thus effectually securing the bail which closely encircles the same. The flexibility of the shank greatly reduces the wear on the stocking and prevents over straining of the fabric, as will be apparent.

The member or bail 4 is preferably formed of wire which is bent up to provide an opening 20 therein, the width of which is slightly greater than that of the head and the length somewhat less. In placing the bail in position, it is first inclined to engage the lower side 19 of the shank and is then drawn upward over the head, as indicated by the arrow in Fig. 1. Upon being released, the bail under the downward pull of the stocking, a portion of which is shown at 21, assumes the position represented in Fig. 10.

If greater flexibility of the shank is desired, the projections 11 connecting the portions 9 and 10 of the frame may be omitted, as shown in Fig. 11 and if the size of the head is found too large, it may be constructed of separated projections as shown in Fig. 5. The bail (Fig. 6) coöperates with the form shown in Fig. 5, to depress the stocking between the projections.

Among the important advantages of the invention may be mentioned the following: the extreme simplicity and inexpensiveness of the device, its effectiveness in operation, the manner of utilizing the supporting webbing and the resulting yielding action which prevents over straining, cutting, tearing, etc., of the stocking, the total absence of springs, snap or other locking devices, the self adapting action of the device in securing a fabric regardless of its thickness, the action of the device in maintaining the members in engagement independent of the pull of the stocking, etc.

Having, therefore, described my invention, I claim,

1. A hose supporter clasp comprising a base plate having rigid projections thereon, a covering for the projections extending downward to the base plate as a yielding shank which tapers toward the base, and a member shorter in one dimension than the corresponding dimension of the projections and shaped to successively engage opposite sides of the shank along lines substantially at right angles to the length of the base plate.

2. A hose supporter clasp comprising a base plate having rigid projections thereon, a covering completely inclosing the projections and extending loosely over the same and downward to the base plate as a yielding shank, and a member shaped to coöperate with the shank along lines substantially at right angles to the length of the base plate.

3. A hose supporter clasp comprising a base plate, a head thereon, a covering for the head extending downward to the base plate as a yielding shank, and a coöperating member having an opening therein, the length of which is less than the length of the head.

4. A hose supporter clasp comprising a member having a covering of webbing presenting freely yielding surfaces extending transversely thereof, and a coöperating member rigid throughout and adapted to engage and bind the hose against such yielding surfaces along lines at right angles to the length of the hose.

5. A hose supporter clasp comprising requisite supporting webbing terminating in a loop, means for shaping the loop to present transversely extending surfaces adapted to yield in the direction of the length of the said shaping means, and a coöperating member of a form suitable for engaging the transversely extending surfaces of the loop to bind the hose against the same along lines substantially at right angles to the length of the said loop shaping means.

In testimony whereof, I affix my signature, in the presence of two witnesses.

WALTER H. PUMPHREY.

Witnesses:
M. G. CRAWFORD,
E. L. MACOUBREY.